United States Patent
Verkiel et al.

(10) Patent No.: US 6,931,837 B2
(45) Date of Patent: Aug. 23, 2005

(54) CONTROL STRATEGY FOR LEAN-TO-RICH TRANSITIONS IN AN INTERNAL COMBUSTION ENGINE

(75) Inventors: Maarten Verkiel, Metamora, IL (US); Justin O'Connor, Batavia, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/703,061

(22) Filed: Nov. 6, 2003

(65) Prior Publication Data

US 2005/0097884 A1    May 12, 2005

(51) Int. Cl.[7] .......................... F01N 3/00; F02M 25/07; F02D 41/00
(52) U.S. Cl. ........................... 60/274; 60/285; 60/602; 123/399; 123/443; 123/568.21
(58) Field of Search .............................. 123/443, 478, 123/480, 492, 493, 352, 361, 399, 436, 568.21; 60/274, 285, 602

(56) References Cited

U.S. PATENT DOCUMENTS

| | | | | |
|---|---|---|---|---|
| 5,826,427 A | * | 10/1998 | Yanagihara et al. | 60/276 |
| 6,012,428 A | * | 1/2000 | Yano et al. | 123/443 |
| 6,543,219 B1 | * | 4/2003 | Surnilla | 60/285 |
| 6,619,033 B2 | * | 9/2003 | Adler et al. | 60/274 |
| 2003/0110760 A1 | * | 6/2003 | Shirakawa | 60/285 |
| 2003/0150425 A1 | * | 8/2003 | Adler et al. | 123/443 |

* cited by examiner

*Primary Examiner*—Tony M. Argenbright
(74) *Attorney, Agent, or Firm*—Dennis Kelly Sullivan; Susan L. Lukasik; Jeffrey P. Calfa

(57) ABSTRACT

An engine (20) and an engine control strategy (FIGS. 2 and 3) for lean-to-rich transitions, such transitions being useful for various purposes, one of which is purging, or regenerating, a NOx adsorber (36) in the engine exhaust system.

18 Claims, 4 Drawing Sheets

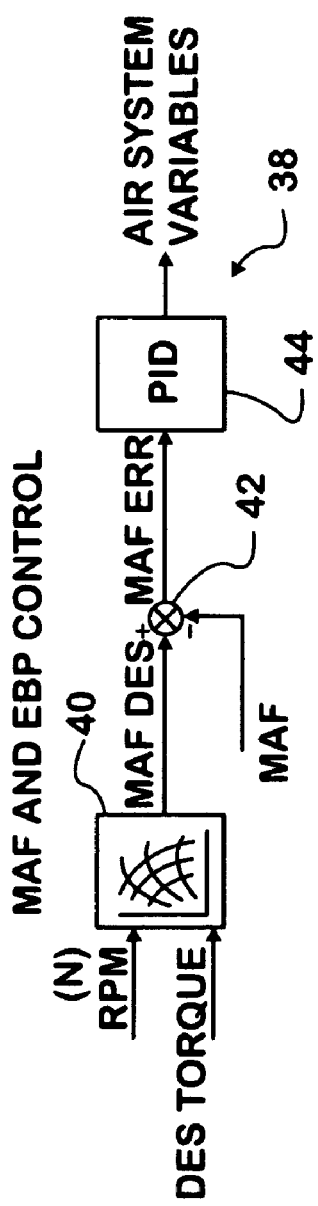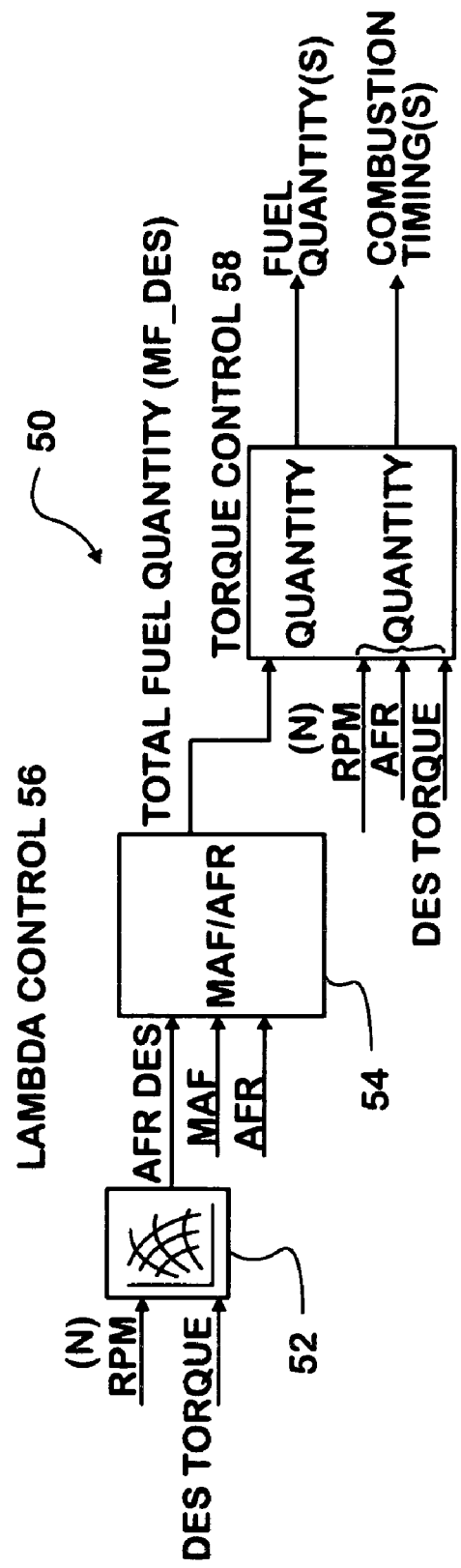

*SOI=START OF INJECTION

FIG. 6
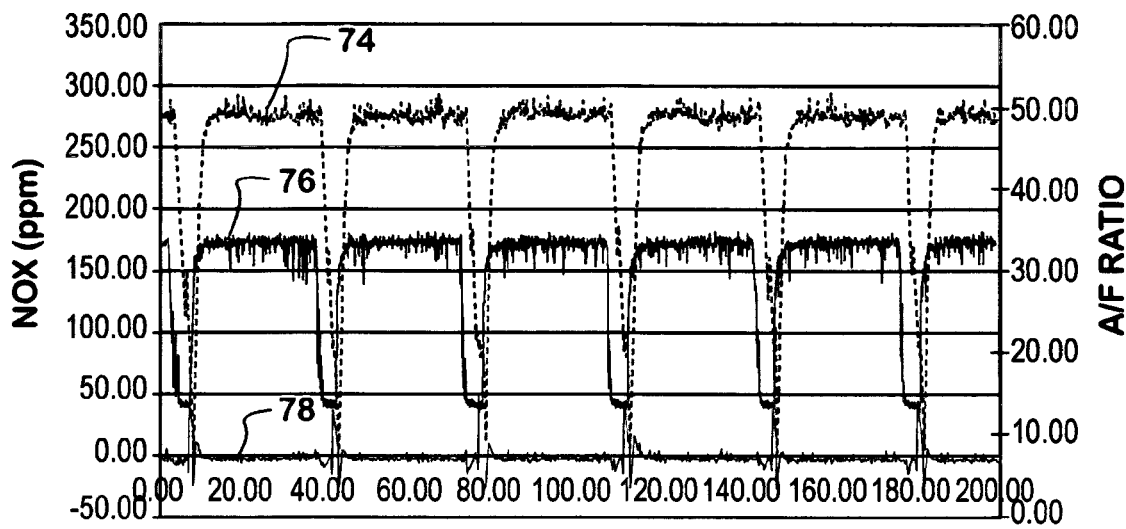
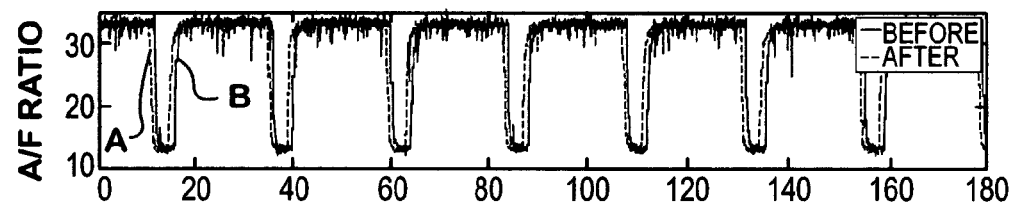
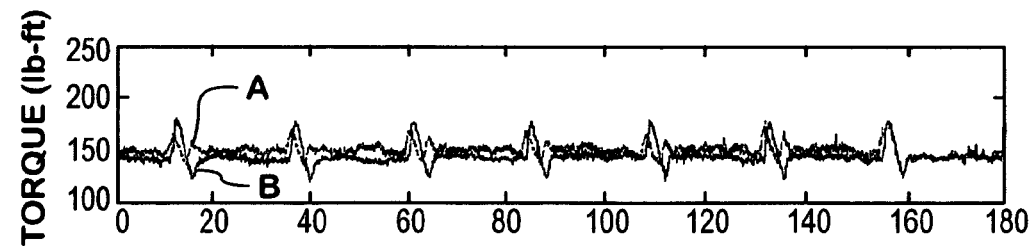
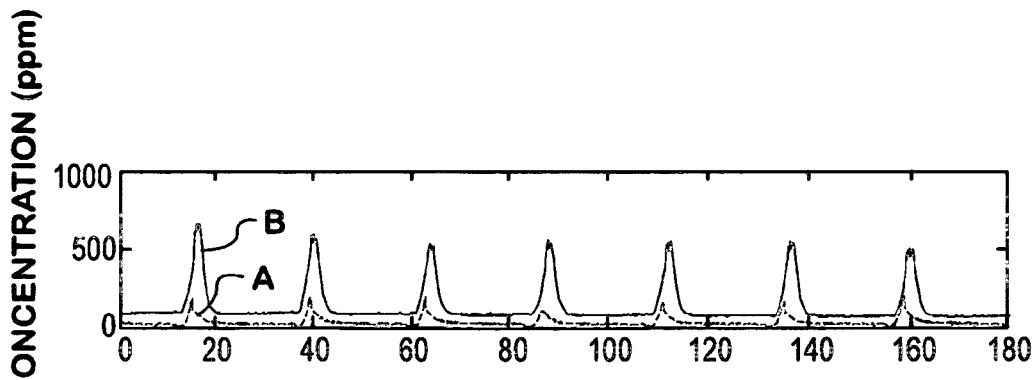
FIG. 7

CONTROL STRATEGY FOR LEAN-TO-RICH TRANSITIONS IN AN INTERNAL COMBUSTION ENGINE

FIELD OF THE INVENTION

This invention relates to motor vehicles that are powered by internal combustion engines. More especially, the invention relates to improvements in engine control when engine running changes from running lean to running rich.

BACKGROUND OF THE INVENTION

The driver of a motor vehicle powered by a diesel engine operates the engine via an accelerator pedal. In a motor vehicle whose engine comprises an electronic control system, the accelerator pedal operates a sensor, sometimes called an accelerator position sensor (APS) that provides an APS signal to the control system indicating the extent to which the driver is depressing the pedal. The control system acts on that signal, along with other signals, to develop appropriate signals for controlling various aspects of engine operation to cause the engine to propel the vehicle in the manner intended by the driver's operation of the accelerator pedal, i.e. accelerate, cruise, or decelerate the vehicle, while striving for efficient use of fuel and minimization of tailpipe emissions. Airflow into the engine and fueling of the engine are two aspects of engine operation that can be controlled.

One configuration for a diesel engine intake system comprises a throttle valve, an EGR (exhaust gas recirculation) valve, and the compressor portion of a turbocharger. One or more of those components (typically all of them) is under the control of the engine control system to control mass airflow into the engine. The fuel system of such an engine comprises electric-actuated fuel injectors under control of the engine control.

In general, a diesel engine runs cooler, slower, and leaner than a spark-ignition engine. At times however, it becomes appropriate for the engine to run rich. The air-fuel ratio is of course controlled by relatively proportioning air and fuel. The combustible mixture may be richened by decreasing the proportion of air, increasing the proportion of fuel, or by a combination of both.

While running lean, the engine generates NOx. The use of a NOx adsorber in the engine exhaust system reduces the amount of NOx that otherwise would enter the atmosphere. The control system of an engine whose exhaust system has such a NOx adsorber monitors the condition of the NOx adsorber and initiates its regeneration when regeneration is needed and the engine is operating in a manner that will allow the regeneration.

When the NOx adsorber is to be regenerated, engine operation transitions from running lean to running rich in order to condition the exhaust for purging the NOx adsorber of adsorbed NOx by generating the excess CO that is needed for the regeneration process. In that instance the transition from running lean to running rich is initiated by the control system itself, rather than the driver. Regeneration occurs from time to time as the engine operates.

Changing the air-fuel ratio in any of the manners mentioned above can have an influence on engine torque production. Consequently, it would be desirable for the regeneration process to be transparent to the driver so that the driver would not sense unexpected change or fluctuations in engine torque due to initiation of a process that he himself did not initiate.

The amount and the timing of engine fueling are two aspects of fueling that are controlled by the engine control system. A typical diesel engine that comprises fuel injectors for injecting fuel into the engine cylinders under control of an engine control system controls both the duration and the timing of each fuel injection to set both the amount and the timing of engine fueling. During an engine cycle, it is also capable of pre-injection of fuel (pilot-injection) in advance of a main injection and post-injection after the main injection, although the use of either typically depends on how the engine is being operated.

SUMMARY OF THE INVENTION

The present invention relates to an engine and an engine control strategy for lean-to-rich transitions, such transitions being useful for various purposes, one of which is purging, or regenerating, a NOx adsorber in the engine exhaust system.

With the engine running lean at a particular speed, the strategy comprises causing the engine to transition from running lean to running rich while striving to maintain a desired engine torque at that particular speed. The transition occurs through processing data values for engine speed and desired engine torque to % develop a data value for desired mass airflow into the engine and a data value for desired air-fuel ratio for rich running, and processing the data value for desired mass airflow into the engine, a data value for actual mass airflow into the engine, and a data value for actual air-fuel ratio to develop a data value for quantity of engine fueling. The data value for quantity of engine fueling and other data relevant to a determination of the timing of introduction of that quantity of engine fueling into the engine during an engine cycle that will cause the engine to run rich while striving to maintain desired engine torque at the particular engine speed are processed to develop a data value for that timing. Intake mass airflow is forced toward that desired mass airflow, and the engine is fueled with that quantity of engine fueling at that timing.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 2 is a schematic diagram of one portion of the control strategy for the engine pursuant to principles of the invention.

FIG. 3 is a schematic diagram of another portion of the control strategy.

FIG. 6 comprises a series of time traces of certain parameters of interest in the strategy.

FIG. 7 comprises several more time traces.

DESCRIPTION OF THE PREFERRED EMBODIMENT

Figure 1:
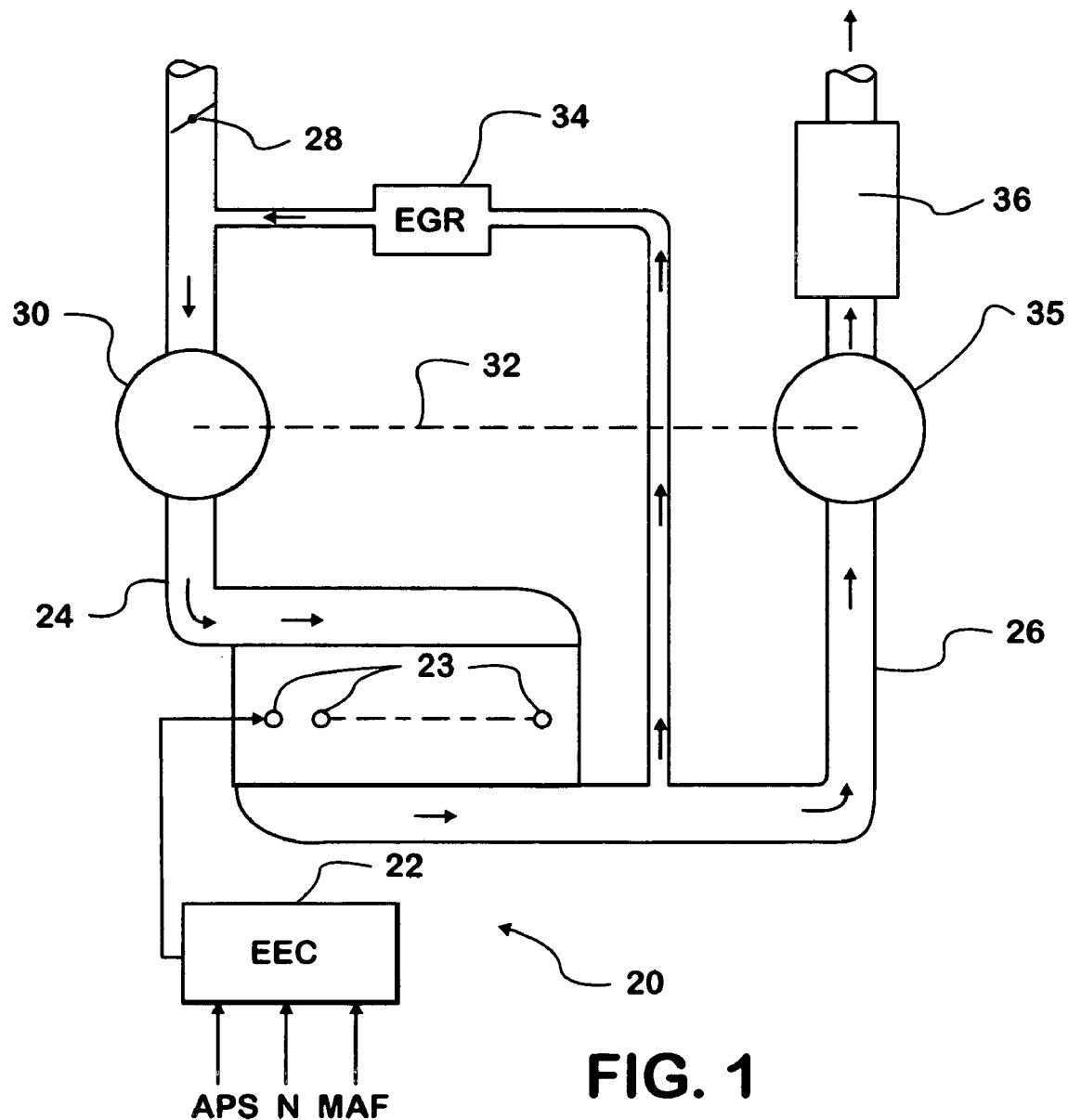
FIG. 1 is a general schematic diagram of portions of a diesel engine relevant to the present invention.

FIG. 1 shows a schematic diagram of an exemplary diesel engine 20 for powering a motor vehicle. Engine 20 has a processor-based engine control system (EEC) 22 that processes data from various sources to develop various control data for controlling various aspects of engine operation. The data processed by control system 22 may originate at external sources, such as sensors, and/or be generated internally. Engine speed N, accelerator pedal position APS, and mass airflow into the engine MAF are parameters relevant to the invention.

Control system 22 controls the operation of electric-actuated fuel injectors 23 that inject fuel into engine combustion chambers. A processor of control system 22 can process data sufficiently fast to calculate, in real time, the timing and duration of injector actuation to set both the timing and the amount of fueling. The injection process comprises a main injection, and under certain conditions, a pilot injection and/or a post-injection.

Engine 20 further comprises an intake system 24 through which charge air enters the combustion chambers, and an exhaust system 26 through which exhaust gases resulting from combustion leave the engine. Intake system 24 comprises a throttle valve 28, the compressor portion 30 of a VGT turbocharger 32, and an EGR valve 34. Exhaust system 26 comprises the turbine portion 35 of turbocharger 32 and a NOx adsorber 36.

From time to time, NOx adsorber 36 must be regenerated in order to purge it of adsorbed NOx so that it can remain effective as the engine continues to run. A known technique for regenerating a NOx adsorber comprises creating an excess of CO for reaction with adsorbed NOx to reduce the NOx to molecular nitrogen ($N_2$) while the CO oxidizes $CO_2$ during the process. Excess CO is created by changing engine operation from running lean to running rich.

FIG. 2 discloses the intake airflow control strategy 38 that is executed by control system 22 to control the mass airflow entering the engine through intake system 24, it being understood that the mass airflow will include some amount of recirculated exhaust gas when EGR valve 34 is open. Control system 22 comprises a map, or look-up table, 40 containing data values for desired mass airflow MAF_des, each of which is correlated with a corresponding set of data values for engine speed N and desired engine torque Torque_des.

Desired engine torque Torque_des is developed from accelerator pedal position APS and engine speed N. For any given engine speed, accelerator pedal position APS and desired engine torque Torque_des may be considered the equivalent of each other.

For current values of engine speed N and desired engine torque Torque_des, the strategy develops a corresponding value for desired mass airflow MAF_des. An algebraic summing function 42 subtracts current actual mass airflow MAF (measured or estimated in any suitable way, such as by a sensor in the exhaust system) from the value obtained from look-up table 40 to develop an error value MAF_err that forms an input for a closed-loop proportional-integral-derivative (P-I-D) control function 44 that controls mass airflow into engine 20 through intake system 24 via control of the various intake system components mentioned earlier. Detail of how those intake system components are controlled depends on the particular engine involved and does not bear on the most general principles of the present invention.

FIG. 3 discloses the fueling control strategy 50 that is executed by control system 22 to control engine fueling via fuel injectors 23. Control system 22 comprises a map, or look-up table, 52 containing data values for desired air-fuel ratio AFR_des, each of which is correlated with, a corresponding set of data values for engine speed N and desired engine torque Torque_des. For current values of engine speed N and desired engine torque Torque_des, the strategy develops a corresponding value for desired air-fuel ratio AFR_des.

Control system 22 comprises a further map, or look-up table, 54 containing data values for desired engine fueling MF_des, each of which is correlated with a corresponding set of data values for desired air-fuel ratio AFR_des, actual mass airflow MAF, and actual air-fuel ratio AFR. For current values of desired air-fuel ratio AFR_des, actual mass airflow MAF, and actual air-fuel ratio AFR, the strategy develops a corresponding value for desired engine fueling MF_des. Look-up tables 52, 54 and the processing of data using them constitute what is identified as Lambda Control 56.

The remainder of FIG. 3 involves what is identified as Torque Control 58. Torque control 58 comprises a strategy for processing data values for desired engine fueling MF_des, engine speed N, actual air-fuel ratio AFR, and desired engine torque Torque_des to develop data for setting timing of fuel injection and quantity of fuel to be injected.

Figure 4:
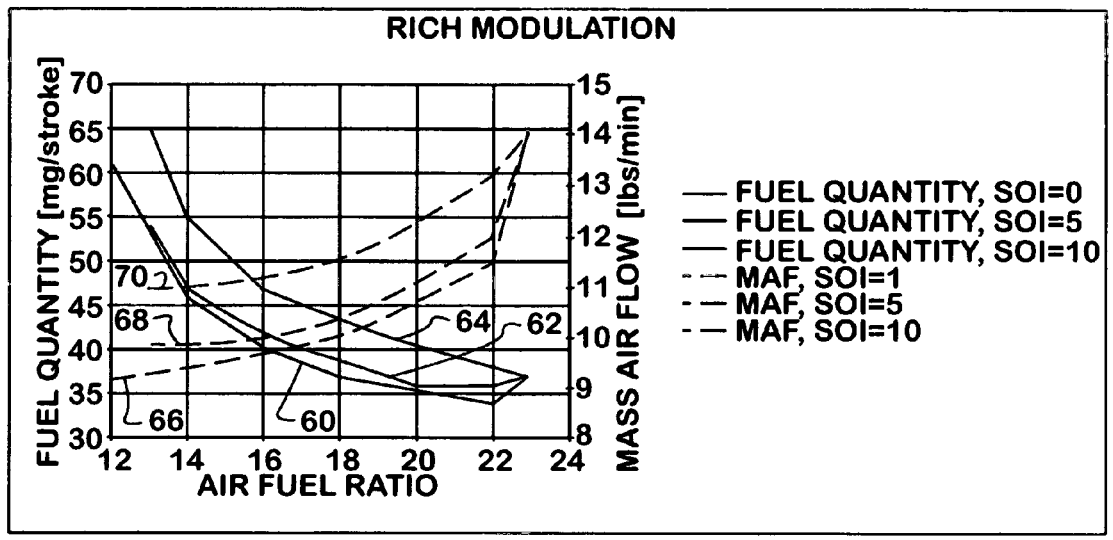
FIG. 4 is a graph plot showing various relationships relevant to the invention.

FIG. 4 illustrates relationships that are involved in the processing. The graph plots of FIG. 4 were developed by running an engine at constant torque with only main injection.

A trace 60 relates fuel injection quantity to air-fuel ratio for injection timing (SOI) commencing at a reference point in the engine cycle designated 0°. A trace 62 relates fuel injection quantity to air-fuel ratio for injection timing commencing at a reference point in the engine cycle designated −5°. A trace 64 relates fuel injection quantity to air-fuel ratio for injection timing commencing at a reference point in the engine cycle designated −10°.

A trace 66 relates mass airflow into the engine to air-fuel ratio for injection timing commencing at the 0° reference point. A trace 68 relates mass airflow into the engine to air-fuel ratio for injection timing commencing at the −5° reference point. A trace 70 relates mass airflow into the engine to air-fuel ratio for injection timing commencing at the −10° reference point.

Traces, 60, 62, 64 show that in order to maintain torque as the air-fuel ratio decreases, the quantity of fueling must increase. At the same time, traces, 66, 68, 70 show that mass airflow must decrease. Collectively, the traces show that for a given air-fuel ratio less than stoichiometric, fueling can be minimized by advancing timing of injection. As an example, consider that trace 64 shows a fueling quantity of about 65 mg per injection at an air-fuel ratio of about 13 while trace 60 shows a quantity of about 53 mg per injection at the same air-fuel ration. Similar examples are also apparent from FIG. 4.

There is a practical limit for mass airflow below which the engine will not run efficiently while striving to maintain torque while running rich, but FIG. 4 clearly shows that fueling can be minimized by advancing timing of injection as airflow approaches that limit.

The functional relationships shown by FIG. 4 can be used in defining data for the strategies shown in FIGS. 2 and 3 so that the strategies implement a number of traces like those specifically shown.

When a lean-to-rich transition is initiated by control system 22, the strategy executes at an appropriate execution rate determined by the control system processor. It is believed that the transition in air-fuel ratio from rich to lean should occur rapidly rather than gradually in order to minimize the loss of fuel efficiency inherent in running rich. Because of inertia inherent in the engine intake system, change in mass airflow occurs more slowly than change in fueling. Hence, quickness of a transition may better controlled by controlling fueling, but it is nonetheless desirable to also control mass airflow to augment quickness of transition.

Figure 5:
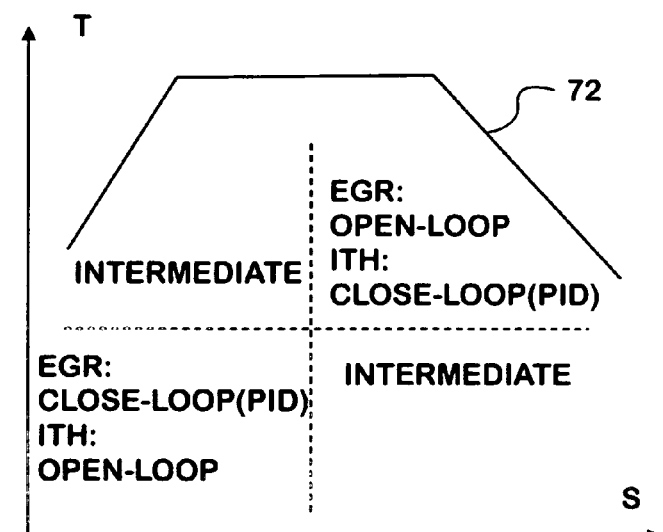
FIG. 5 is a torque-speed graph displaying certain principles that have been discovered for optimizing control strategy.

FIG. 5 illustrates certain general principles for optimizing control strategy. The horizontal axis represents engine speed, and the vertical axis, engine torque. The trace 72 is representative of engine torque production for a certain quantity of fueling. For each of different quantities of engine fueling, there exists a corresponding trace that is generally similar to trace 72, but they are not specifically shown in FIG. 5.

What FIG. 5 does show is a division into four quadrants, each of which is marked with a general aspect of control strategy for achieving the desired lean-to-rich transition. When the engine is operating in the upper right quadrant marked "EGR:Open-loop—ITH: Close-loop (PID)" the control strategy forces closed-loop control of throttle 28 while allowing control of EGR 34 to go open-loop. When the engine is operating in the lower left quadrant marked "EGR:Close-loop (PID)—ITH: Open-loop" the control strategy forces closed-loop control of EGR 34 while allowing control of throttle 28 to go open-loop. In the other two quadrants, the EGR and throttle are controlled with varying degrees of open- and closed-loop control. Closed-loop control of both EGR and throttle may involve the use of respective position sensors for measuring the extent to which each is open. Control of the duty cycle of the signal applied to control VGT turbocharger 32 may also be used as part of the strategy of FIG. 2.

FIG. 6 illustrates three time traces 74, 76, 78 with an engine running at a substantially constant speed and load. Trace 74 represents the concentration in ppm (parts per million) of NOx entering NOx adsorber 36. Trace 78 represents the concentration in ppm (parts per million) of NOx exiting NOx adsorber 36. Trace 76 represents air-fuel ratio.

During each lean-to-rich transition, the concentration of NOx entering NOx adsorber 36 drops quite precipitously. There is a small spike in concentration of NOx exiting NOx adsorber 36. Averaged over time, the exiting NOx concentration remains low while the occasional lean-to-rich transitions regenerate the NOx adsorber to maintain its effectiveness.

FIG. 7 shows a distinctive benefit of the present invention. Each of the three plots contains two time traces marked A and B. The two upper plot traces represent air-fuel ratio; the two middle plot traces represent engine torque production; and the two lower plot traces represent exiting NOx concentration in ppm (parts per million). The traces marked B were developed by running an engine in a substantially steady state condition without the present invention. The traces marked A were developed by running the engine in the same substantially steady state condition, but with the control strategy of the present invention. Comparison of the two sets of traces shows that by controlling air and/or fuel to maintain engine torque and speed while significantly decreasing the air-fuel ratio in the process, the NOx adsorber can be effectively regenerated while average NOx emissions are significantly decreased.

While a presently preferred embodiment of the invention has been illustrated and described, it should be appreciated that principles of the invention apply to all embodiments falling within the scope of the following claims.

What is claimed is:

1. A control method for lean-to-rich modulation of an internal combustion engine comprising:
    with the engine running lean at a particular speed, causing the engine to transition from running lean to running rich while striving to maintain a desired engine torque at that particular speed by
    a) processing data values for engine speed and desired engine torque to develop a data value for desired mass airflow into the engine and a data value for desired air-fuel ratio for rich running,
    b) processing the data value for desired air-fuel ratio for rich running, a data value for actual mass airflow into the engine, and a data value for actual air-fuel ratio to develop a data value for quantity of engine fueling,
    c) processing the data value for quantity of engine fueling and other data relevant to a determination of the timing of introduction of that quantity of engine fueling into the engine during an engine cycle that will cause the engine to run rich while striving to maintain desired engine torque at the particular engine speed, to develop a data value for that timing,
    d) forcing intake mass airflow toward that desired mass airflow, and
    e) fueling the engine with that quantity of engine fueling at that timing.

2. A control method as set forth in claim 1 in which step c) comprises:
    processing the data value for quantity of engine fueling, the data value for engine speed, the data value for actual air-fuel ratio, and the data value for desired engine torque to develop the data value for the timing of introduction of that quantity of engine fueling into the engine during an engine cycle that will cause the engine to run rich while striving to maintain desired engine torque at the particular engine speed.

3. A control method as set forth in claim 1 wherein step d) comprises:
    forcing intake mass airflow toward that desired mass airflow by control of one or more components of an intake system of the engine through which the airflow enters the engine.

4. A control method as set forth in claim 3 wherein the step of forcing intake mass airflow toward that desired mass airflow by control of one or more components of an intake system of the engine through which the airflow enters the engine comprises control of exhaust gas recirculation (EGR).

5. A control method as set forth in claim 3 wherein the step of forcing intake mass airflow toward that desired mass airflow by control of one or more components of an intake system of the engine through which the airflow enters the engine comprises control of a throttle valve through which fresh intake air enters the intake system.

6. A control method as set forth in claim 3 wherein the step of forcing intake mass airflow toward that desired mass airflow by control of one or more components of an intake system of the engine through which the airflow enters the engine comprises controlling a signal that controls a turbocharger having a turbine in an exhaust system of the engine and a compressor in the intake system.

7. A control method as set forth in claim 3 wherein the step of forcing intake mass airflow toward that desired mass airflow by control of one or more components of an intake system of the engine through which the airflow enters the engine comprises controlling one or more components by closed-loop control for certain combinations of engine speed and torque, by open-loop control for certain other combinations of engine speed and torque, and by varying degrees of both open- and closed-loop control for still other combinations of engine speed and torque.

8. A method for regenerating a NOx adsorber in an exhaust system of an internal combustion engine by conditioning engine operation to generate excess CO for inducing regeneration, the strategy comprising:

with the engine running lean at a particular speed, generating excess CO by causing the engine to transition from running lean to running rich while striving to maintain a desired engine torque at that particular speed by a) processing data values for engine speed and desired engine torque to develop a data value for desired mass airflow into the engine and a data value for desired air-fuel ratio for rich running, b) processing the data value for desired air-fuel ratio for rich running, a data value for actual mass airflow into the engine, and a data value for actual air-fuel ratio to develop a data value for quantity of engine fueling, c) processing the data value for quantity of engine fueling and other data relevant to a determination of the timing of introduction of that quantity of engine fueling into the engine during an engine cycle that will cause the engine to run rich while striving to maintain desired engine torque at the particular engine speed, to develop a data value for that timing, d) forcing intake mass airflow toward that desired mass airflow, and e) fueling the engine with that quantity of engine fueling at that timing.

9. A method as set forth in claim 8 in which step c) comprises:

processing the data value for quantity of engine fueling, the data value for engine speed, the data value for actual air-fuel ratio, and the data value for desired engine torque to develop the data value for the timing of introduction of that quantity of engine fueling into the engine during an engine cycle that will cause the engine to run rich while striving to maintain desired engine torque at the particular engine speed.

10. A method as set forth in claim 8 wherein step d) comprises:

forcing intake mass airflow toward that desired mass airflow by control of one or more components of an intake system of the engine through which the airflow enters the engine.

11. An internal combustion engine comprising:

a) a fueling system for fueling the engine in accordance with a data value for desired engine fueling, b) an intake system through which airflow enters the engine, and c) a control system for processing various data to develop data for control of various engine functions including data values for desired engine fueling, for desired mass airflow into the engine, and for desired air-fuel ratio, wherein the control system comprises a control strategy, i) for causing the engine to transition from running lean to running rich while striving to maintain engine torque at a particular engine speed by, ii) processing data values for engine speed and desired engine torque to develop a data value for desired mass airflow into the engine and a data value for desired air-fuel ratio for rich running, iii) processing the data value for desired air-fuel ratio for rich running, a data value for actual mass airflow into the engine, and a data value for actual air-fuel ratio to develop a data value for quantity of engine fueling, iv) processing the data value for quantity of engine fueling and other data relevant to a determination of the timing of introduction of that quantity of engine fueling into the engine during an engine cycle that will cause the engine to run rich while striving to maintain desired engine torque at the particular engine speed, to develop a data value for that timing, v) forcing intake mass airflow toward that desired mass airflow, and vi) fueling the engine with that quantity of engine fueling at that timing.

12. An engine as set forth in claim 11 in which the pardon of the control strategy for processing the data value for quantity of engine fueling and other data relevant to a determination of the timing of introduction of that quantity of engine fueling into the engine during an engine cycle that will cause the engine to run rich while striving to maintain desired engine torque at the particular engine speed to develop a data value for that timing comprises strategy for processing the data value for quantity of engine fueling, the data value for engine speed, the data value for actual air-fuel ratio, and the data value for desired engine torque to develop the data value for the timing of introduction of that quantity of engine fueling into the engine during an engine cycle that will cause the engine to run rich while striving to maintain desired engine torque at the particular engine speed.

13. An engine as set forth in claim 11 in which the portion of the control strategy for forcing intake mass airflow toward that desired mass airflow comprises strategy for forcing intake mass airflow toward that desired mass airflow by closed-loop control of one or more components of an intake system of the engine through which mass airflow enters the engine.

14. An engine as set forth in claim 13 wherein the one or more components of the intake system comprise one or more of an exhaust gas recirculation (EGR) valve that controls recirculation of exhaust gas from an exhaust system of the engine to the intake system, a throttle valve through which fresh intake air enters the intake system, and a turbocharger having a turbine in an exhaust system and a compressor in the intake system.

15. An engine as set forth in claim 13 wherein the one or more components is controlled by closed-loop control for certain combinations of engine speed and torque, by open-loop control for certain other combinations of engine speed and torque, and by varying degrees of both open- and closed-loop control for still other combinations of engine speed and torque.

16. An internal combustion engine comprising:

a) a fueling system for fueling the engine in accordance with a data value for desired engine fueling;

b) an intake system through which airflow enters the engine;

c) a NOx adsorber in an exhaust system of the engine; and d) an engine control system that at times conditions engine operation to generate excess CO for inducing regeneration of the NOx absorber and that comprises a strategy for generating excess CO by causing the engine to transition from running lean at a particular speed to running rich while striving to maintain a desired engine torque at that particular speed by
i) processing data values for engine speed and desired engine torque to develop a data value for desired mass airflow into the engine and a data value for desired air-fuel ratio for rich running,
ii) processing the data value for desired air-fuel_ratio for rich running, a data value for actual mass airflow into the engine, and a data value for actual air-fuel ratio to develop a data value for quantity of engine fueling,
iii) processing the data value for quantity of engine fueling and other data relevant to a determination of the timing of introduction of that quantity of engine fueling into the engine during an engine cycle that will cause the engine to run rich while striving to maintain desired engine torque at the particular engine speed, to develop a data value for that timing,
iv) forcing intake mass airflow toward that desired mass airflow, and
v) fueling the engine with that quantity of engine fueling at that timing.

17. An engine as set forth in claim 16 in which step iii) comprises:

processing the data value for quantity of engine fueling, the data value for engine speed, the data value for actual air-fuel ratio, and the data value for desired engine torque to develop the data value for the timing of introduction of that quantity of engine fueling into the engine during an engine cycle that will cause the engine to run rich while striving to maintain desired engine torque at the particular engine speed.

18. An engine as set forth in claim 16 wherein step iv) comprises:

forcing intake mass airflow toward that desired mass airflow by control of one or more components associated with the intake system.

* * * * *